(12) United States Patent
Abdel-Fattah et al.

(10) Patent No.: US 7,915,475 B2
(45) Date of Patent: Mar. 29, 2011

(54) METAL REMEDIATION USING A MESOPOROUS NANOCOMPOSITE

(75) Inventors: Tarek Abdel-Fattah, Yorktown, VA (US); Larry K. Isaacs, Yorktown, VA (US)

(73) Assignee: Christopher Newport University, Newport News, VA (US)

( * ) Notice: Subject to any disclaimer, the term of this patent is extended or adjusted under 35 U.S.C. 154(b) by 562 days.

(21) Appl. No.: 10/882,175

(22) Filed: Jul. 2, 2004

(65) Prior Publication Data

US 2011/0046430 A1 Feb. 24, 2011

(51) Int. Cl.
- *B01J 20/10* (2006.01)
- *B01J 20/16* (2006.01)
- *B01J 20/18* (2006.01)

(52) U.S. Cl. ......... 588/412; 502/407; 502/414; 588/407

(58) Field of Classification Search .................. 588/407, 588/412, 259; 423/98; 502/407, 414, 415
See application file for complete search history.

(56) References Cited

U.S. PATENT DOCUMENTS

| 6,096,288 A | * | 8/2000 | Roth | 423/702 |
| 6,930,219 B2 | * | 8/2005 | Shan et al. | 585/533 |

OTHER PUBLICATIONS

Tarek Abdel-Fattah, May 2003, Abstracts of Papers, 81$^{st}$ Annual Meeting of the Virginia Academy of Science, p. 83.*
Abdel-Fattah et al. "Using organo-silicate nanocomposites for aqueous lead species removal", Environmental Management Science Program (EMSP) Symposium, Mar. 23-27, 2003, New Orleans, LA.

* cited by examiner

*Primary Examiner* — Stanley Silverman
*Assistant Examiner* — James A Fiorito
(74) *Attorney, Agent, or Firm* — Birch, Stewart, Kolasch & Birch, LLP

(57) ABSTRACT

A novel method for remediating metals includes treating the metals with a mesoporous nanocomposite such as HMS, MCM-41 or MCM-48. The metal is preferably lead but can be at least one metal selected from Pb, Hg, Cd, Zn, Sn, As, Sb, In, Se, Ga, Te, Bi, Ni, Cu, Mo, Ni, Cu, Sr, Ba or Co. The treating is preferably performed at a pH of about 4 to about 12. In the invention, the treating can also include desorbing the metal from the mesoporous nanocomposite at a pH of about 2 or less.

22 Claims, 2 Drawing Sheets

Ogano-silicate nanocomposite XRD patterns

Removal efficiencies

METAL REMEDIATION USING A MESOPOROUS NANOCOMPOSITE

BACKGROUND OF THE INVENTION

1. Field of the Invention

The invention pertains to the immobilization and remediation of metals in the soil and aqueous media using mesoporous nanocomposites.

2. Description of the Related Art

Heavy metal contamination in the soil represents a serious environmental problem that requires innovative solutions. One of the sources of heavy metal contamination arises from metal-containing ordinance used in firing ranges.

The Environmental Protection Agency (EPA) has estimated 4% or 72,575 metric tons per year of all lead made in the United States is made into bullets. Much of this lead finds it way into one of 2,600 military small arms firing ranges (SAFRs) or 9,000 non-military outdoor shooting ranges in the United States. The Department of Defense ranges typically train with the M-16, M-60 and M-9 soldier held weapons. Each 5.56 mm M193 bullet used by the M-16 rifle, contains 2.49 g of lead. The 7.62 mm M80 bullet used by the M-60 machine gun contains 6.28 g of lead and the 9.00 mm M882 ball military handgun contains 6.54 g of lead. Ranges typically use earth backstops, where lead accumulates and bullet metals, lead, copper, zinc, antimony, and potentially arsenic interacts with the soil complex and water.

Immobilization of lead (Pb) contaminates in soil and stormwater at small arms firing ranges (SAFR) is necessary to comply with environmental regulations and to protect the environment. Although metallic Pb from unweathered bullets in soil has low chemical reactivity, it is possible to mobilize Pb in the soil and aqueous media with low pH (acidity), significant changes in ionic strength or changes in the reduction oxidation potential.

Metallic Pb from unweathered bullets in soil has low chemical reactivity, but Pb can be mobilized by low pH, significant changes in ionic strength, or changes in the reduction-oxidation potential (redox), by binding metal ions to soil organic matter or held on inorganic soil through adsorption or ion exchange. Tilling or disturbing the soil has also been shown to increase the weathering of lead shot and to increase the mobility of lead in soils. Labile Pb represents a significant regulatory, environmental and health concern. Methods to reduce, control or eliminate the impact of soluble lead discharge from SAFR berms to the environment are varied and complex.

Removal of $Pb^{2+}$ from contaminated soils and wastewaters by activated carbon have been reported. Precipitation, ion exchange, organic, and inorganic adsorption on activated carbon have been effective. Zeolites have also been considered as $Pb^{2+}$ and other metal ion adsorbents.

Natural materials can provide lead removal efficiencies as high as 99% for clinoptilolite and chabazite. Wastewater contaminated $Pb^{2+}$ and other heavy metals have been treated by 13X molecular sieves and removed >95% of the metals with a saturation adsorption time of 10 minutes. Molecular sieves 13X have been reported as effective adsorbents of $Pb^{2+}$ contaminated wastewaters.

These methods utilized to remediate heavy metal contamination include four fundamental processes: physical separation, erosion control, soil modification and phyto-remediation. Physical separation techniques have been used by the chemical and mining industry for many years. The other methods have also been used under varying situations and conditions. Generally these methods are expensive and time consuming.

Nanomaterials are now coming under scrutiny in a wide variety of industrial applications. Sorptive organic-silicate materials are known as organic intermediates or precursors of a class of inorganic silicate catalysts or catalyst supports used, for instance, in petroleum refinery syntheses. However, the potential for use as environmental remediation media has not been realized because of the high calcining temperatures associated with these nanomaterials.

Accordingly, there is a desire for new technologies that can effectively remediate heavy metal contamination in the soil and aqueous systems.

SUMMARY OF THE INVENTION

The invention therefore overcomes the disadvantages of related heavy metal remediation technologies.

The invention, in part, pertains to a method for remediating metals that includes treating the metals with a mesoporous nanocomposite. The mesoporous nanocomposite can be at least one material selected from the group consisting of HMS, MCM-41 and MCM-48. The mesoporous nanocomposite can contain at least one surfactant head group selected from the group consisting of carboxylates, sulfonates, phosphates and hydroxilates. The metal can be at least one metal selected from the group consisting of Pb, Hg, Cd, Zn, Sn, As, Sb, In, Se, Ga, Te, Bi, Ni, Cu, Mo, Ni, Cu, Sr, Ba and Co. Preferably, the metal is Pb. The treating is preferably performed at a pH of about 4 to about 12.

In the invention, the treating can also include desorbing the metal from the mesoporous nanocomposite. The metal can be present in soil or an aqueous medium such as in a firing range soil or in stormwater. The treating is performed for a period of time determined by soil and/or water parameters and metal concentration. The treating is performed at a temperature range of about 1-100° C., and preferably at a temperature range of about 23-45° C. Also, the treating with the mesoporous nanocomposite can be accompanied by treating with an auxiliary adsorbent, such as zeolites, clinoptilolites, chabazite, vermiculite, silica, 13X, molecular sieves, francolite, corncob-based products, activated alumina, activated carbon or ion exchange resins. The treating can also be supplemented by electro-coagulation, nano- and micro-filtering, and similar water treatment methods.

The invention, in part, pertains to a composition for remediating metals that includes a mesoporous nanocomposite and a suitable carrier. The mesoporous nanocomposite is at least one material selected from HMS, MCM-41 or MCM-48. The metal is at least one metal selected from the group consisting of Pb, Hg, Cd, Zn, Sn, As, Sb, In, Se, Ga, Te, Bi, Ni, Cu, Mo, Ni, Cu, Sr, Ba and Co, and the metal is preferably Pb. Also, the composition is used at a pH of about 4 to about 12. Further, the carrier is at least one material selected from the group consisting of sand, clay, kaolin, bentonite, diatomaceous earth, sawdust, plastic beads, water, and a nonaqueous solvent.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illus

DETAILED DESCRIPTION

Figure 1:
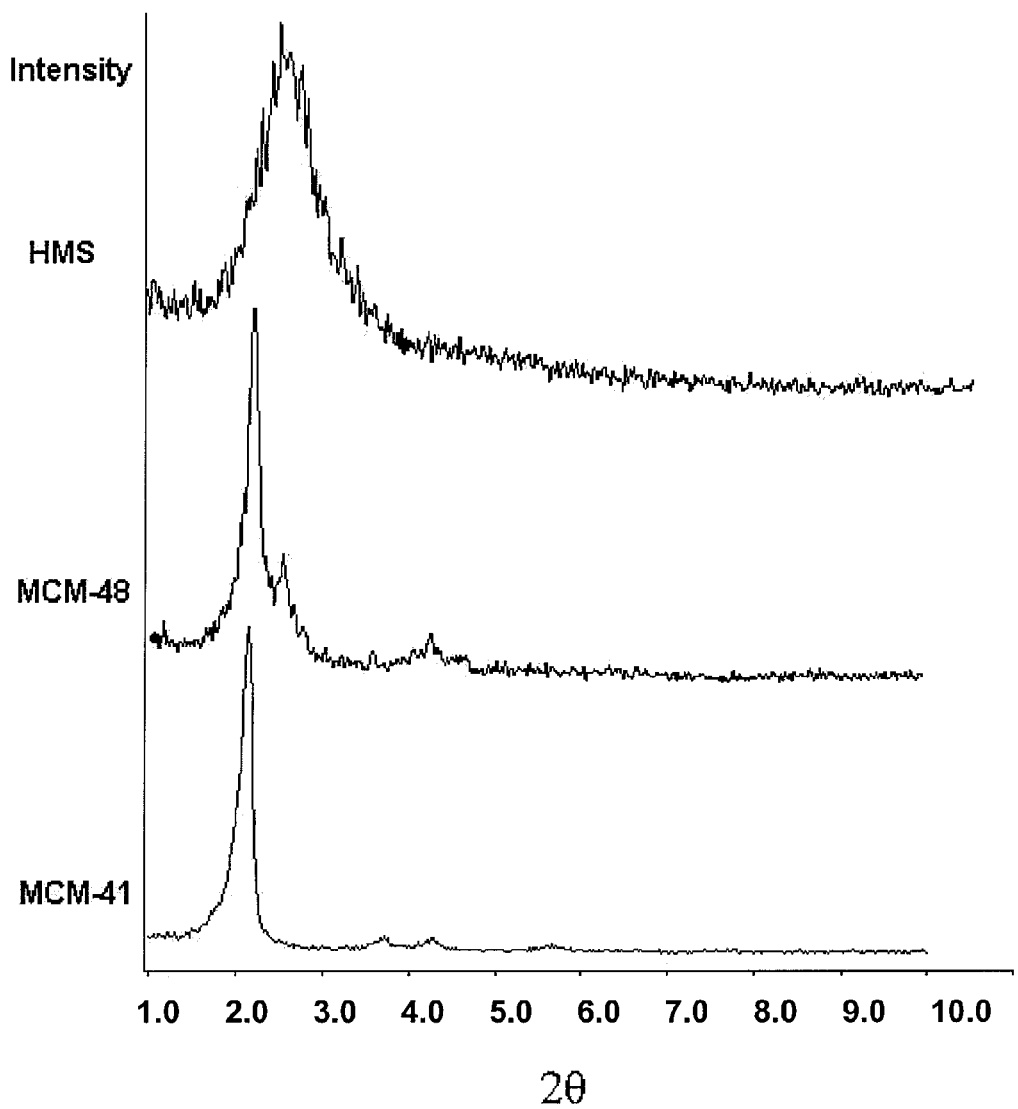
- FIG. 1 shows X-ray diffraction (XRD) patterns for each material.

Advantages of the invention will become more apparent from the detailed description given herein after. However, it should be understood that the detailed description and specific examples, while indicating preferred embodiments of the invention, are given by way of illustration only, since various changes and modification within the spirit and scope of the invention will become apparent to those skilled in the art from this detailed description.

Mesoporous nanocomposite materials include a wide range of meso-silicates and oxides. Use of mesoporous nanocomposites as molecular sieves obtain performance superior to zeolites due the higher surface area and pore structure obtainable in mesoporous nanocomposites.

The inventive mesoporous materials include a wide range of meso-silicates and oxides. Mesoporous sieves such as MCM-41 have high surface area and order of pores, which are larger than zeolites. MCM-41 hybrids with organo-sulfur groups have a high affinity for heavy metals.

MCM-41 can be synthesized by co-condensation of tetraethoxysilane (TEOS) or any other source of $SiO_2$ and organoalkoxysilanes in an ethanol solution containing ammonia and cetyltrimethylammonium bromide as the templating agent with a metal ion affinity.

Mesoporous nanocomposite materials can include surfactant-based microporous hybrid silicates. These materials include synthesized silicate nanocomposites having hexagonal mesoporous structure (HMS), and MCM-41, while MCM-48 exhibits a cubic bi-continuous structure. These materials exhibit excellent adsorbent performance in the presence of $Pb^{2+}$ in forms that can by typified by, but not restricted to compounds such as aqueous $Pb(NO_3)_2$.

A surfactant and an inorganic precursor is processed to yield a nanocomposite:

$$C_nH_{2n+1}X(R)_y + I \rightarrow C_nH_{2n+1}XI$$

where y=2-4, n=6-18, I contains the metal M, M=Si or Al, $X(R)_y = NH_2, SH, NH_4^+, NR_4^+, OH^-, PO_4^{3-}, SO_4^{2-}$ or $SO_3^{2-}$, and R=H, $CH_3, C_2H_5, C_3H_7$ or $C_4H_9$. For example, HMS has y=2, n=12, M=Si and R=H. MCM-41 and MCM-48 have y=3, n=16, M=Si and R=$CH_3$.

The inventive nanomaterials can have a wide range of head groups, which include but are not restricted to carboxylates, sulfonates, phosphates, hydroxilates or mixtures of the same.

Zeolites are also known as effective $Pb^{2+}$ adsorbents. Adsorbent materials such as activated carbon, naturally occurring zeolites (Clinoptilolite and Chabazite) and molecular sieves (13X and 5A) are point-of-use materials for mitigating wastewater. These materials can be used as carriers for the inventive mesoporous nanocomposite materials. Other materials can also be used as carriers, and they can be, but are not restricted to clays, montmorillite, kaolin, diatomaceous earth, vermiculite, cellulosics and sand.

The inventive organo-silicate nanocomposites (HMS, MCM-41 and MCM-48) also provide promising adsorbent results. The relative average lead adsorption is observed to be: 13X>Chabazite>Clinoptilolite>5A>MCM-41>HMS>MCM-48>activated carbon.

EXAMPLES

Materials: Reagents used for the synthesis included $NH_4OH$ (30 wt. %), Tetraethyl-orthosilicate (TEOS) $Si(OC_2H_5)_4$, and Cetyltrimethylammonium bromide (CTABr) $CH_3(CH_2)_{15}N^+(CH_3)_3Br^-$ (Aldrich, as supplied). The synthesis of the silica mesoporous materials was performed using the reaction compositions set forth below.

HMS was prepared using TEOS, MW=208.33; $C_{12}$ amine 'dodecylamine' $CH_3(CH_2)_{11}NH_2$ MW=185.36; and EtOH 'ethanol' $C_2H_5OH$ MW=46. Molar ratios were: 30.3 mmol TEOS:6.74 mmol $C_{12}$ amine:217 mmol EtOH:500 mmol $H_2O$.

MCM-41 was prepared using TEOS MW=208.33; CTABr MW=364.46 in molar ratios of: 3.636 mmol CTAB:15.15 mmol NaOH:30.3 mmol TEOS:3939 mmol $H_2O$.

MCM-48 was prepared using TEOS MW=208.33; CTABr MW=364.46 in molar ratios of: 19.695 mmol CTAB: 15.15 mmol NaOH:30.3 mmol TEOS:1878.6 mmol $H_2O$.

Reagent grade chemicals were used for all solutions. Lead nitrate, crystal, reagent grade, CAS 10099-74-8, and lead standard solution, 1000 mg $L^{-1}$ were supplied by Malindcroft Chemical Works, St Louis, Mo.

Methods: The resulting gel was aged from several hours to 3 days at 110° C. in Teflon-lined stainless steel autoclaves. The product was filtered, washed with distilled water. X-ray powder diffraction (XRD) patterns were obtained on a Siemens diffractometer equipped with a rotating anode and Cu-Kα radiation (wavelength λ=0.15418 nm).

All masses were weighed using a Sartorius balance, model BP210S (Cary, N.C.). Temperature experiments were completed with a Bigger Bill reciprocating shaker and water bath (Barnstead/Thermolyne, Dubuque, Iowa). Atomic adsorption measurements used a Spectra AA 220 Graphite Furnace Atomic Adsorption (GFAA) spectrometry (Varian Australia Pty Ltd, Mulgrave, Australia) with a Varian Graphite Tube Analyzer (GTA) 110. Calibration curves were completed before each sample run with 0, 15, 30 and 45 $\mu L^{-1}$ control samples and maximum &RSD<15 for triplicate sample sets. Qualitative results were obtained using Perkin Elmer 1600 FTIR spectrometer (Norwalk, Conn.). FTIR calibration used 3M™ type 62, polytetrafluororthlene and polystyrene calibration film 0.05 mm, part #186-2082.

Isotherms: The isotherm study used different adsorbent masses of 0.050, 0.100, 0.150, and 0.300 g, added to 50.0 mL of solution, 50 $\mu L^{-1}$ $Pb^{2+}$ as $Pb(NO_3)_2$. Samples were vigorously hand shaken for 30 s and equilibrated at 48 h at constant temperature (23.0±1° C.). Samples were then filtered through spun glass and then analyzed by GFAA. Comparison with Langmuir and Freundlich isotherm models were made using the following equation.

Measurements for the effects of pH on adsorption used 0.0500 g of each adsorbent added to 50.00 mL of solution containing 50.00 μg $L^{-1}$ $Pb^{2+}$ as $Pb(NO_3)_2$. Hydrogen ion concentration was prepared by adding NaOH and $HNO_3$ dropwise to achieve pH values of 2, 4, 6, 8, 10, and 12. Bottles were vigorously hand shaken for 30 sec and equilibrated for 48 hours at constant temperature (23.0±1° C.). Samples were filtered through spun glass, and then analyzed by GFAA.

The effects of ionic strength used 0.0500 g of each adsorbent added to 50.00 mL of solution containing 50.00 μg $L^{-1}$ $Pb^{2+}$ as $Pb(NO_3)_2$. Solutions contained stock $Pb(NO_3)_2$, 0.01M $KNO_3$ and 0.1M $KNO_3$. The bottles were vigorously hand shaken for 30 sec and equilibrated at 48 hours at constant temperature (23.0±1° C.). Samples were filtered through spun glass, and then analyzed by GFAA.

The effects of temperature on adsorbent performance used 0.0500 g adsorbent added to 50.00 mL of solution containing 50.00 μg L$^{-1}$ Pb$^{2+}$ as Pb(NO$_3$)$_2$. The bottles were vigorously hand shaken for 30 sec and equilibrated at 48 hours at 23.0±1° C., 35.0±1° C., and 45.0±1° C. in American Shaking Water Bath (Model #YB-531, Japan) at a shake speed of 5. Samples were filtered through spun glass, and then analyzed by GFAA.

An equilibration time of 48 hours was used in the examples. However, any reasonable exposure time can be used. That is, Exposure times of 1 hour, 12, hours, 24 hours, 36 hours, 48 hours, 60 hours, and 72 hours. The mesoporous nanomaterials can also be used for long term remediation, for example, exposures of 1 week, 1 month, 2 months, 3 months, etc. up to exposure times of 1 year. The experimental results show that the half life reaction order was 19 minutes for MCM-41, 66 minutes for HMS and 108 minutes for MCM-48.

Desorption: Dry adsorbent samples were obtained using a Buchner funnel to collect adsorbents on Whatman qualitative #1 filter paper. Filter paper and adsorbents were air dried for 48 h. The desorption experiment used 0.0500 g of air-dried adsorbent added to 50 mL of 0.1 M KNO$_3$ to which HNO$_3$ was added drop wise to obtain pH values of 6, 5, 4, 3.5, 3, 2.5 and 2. The bottles were vigorously hand shaken for 30 sec and equilibrated for 48 hours at constant temperature (23.0±1° C.). Samples were filtered through spun glass, and then analyzed by GFAA.

Qualitative Analysis: The interaction before and after exposure to Pb$^{2+}$ of the mesoporous sieves was completed using dry adsorbent samples obtained as described in the desorption measurement described above. Fisher Scientific IR Grade KBr, P-227, Lot 991470A was used to pelletize adsorbents at a 1:10, adsorbent to KBr, ratio. Infrared spectra were measured using a Perkin Elmer Model 1600 FTIR spectrophotometer.

Statistical Analysis: Comparison between adsorbents and other parameters was completed by single and two-factor ANOVA. Percent relative standard deviations were computed for all replicate samples analyzed.

Results

Sorption describes when organic and metallic materials attach to an adsorbent (the chemical and physical adsorption processes which take place). When the rate of adsorption equals the rate of desorption, equilibrium is achieved and the capacity of the adsorbent material is reached. The theoretical adsorption capacity of the adsorbent are determined by calculating the adsorption isotherm. Model equations to represent experimental data were developed by Langmuir, and Freundlich. Mesoporous sieves in this study fit Langmuir and Freundlich isotherm models.

The XRD patterns for as-synthesized (composites) MCM-41, MCM-48 and HMS are shown in FIG. 1. The observation of a high-intensity peak having a d spacing of approximately 4.2 nm and several higher angle peaks having d spacing consistent with hexagonal lattice is typical of MCM-41. The XRD pattern of MCM-48 exhibited a high-intensity peak having d spacing of approximately 4.1 nm confirming a cubic phase. The XRD pattern of HMS exhibited a single diffraction peak corresponding to a d spacing of 3.8 nm. The XRD patterns of these nanocomposites agree with literature patterns.

Figure 2:
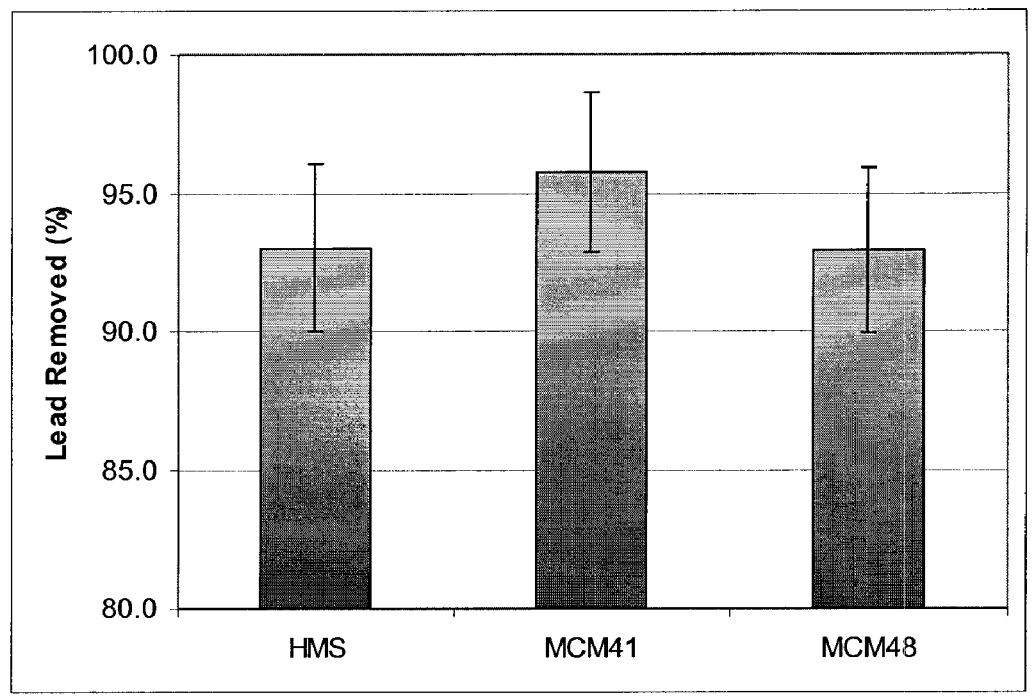
FIG. 2 shows a diagram of lead removal efficiency for HMS, MCM-41 and MCM-48.

Linear regression equation and correlation coefficient used the Langmuir isotherm model. Initial Pb$^{2+}$ concentrations=20 μg L$^{-1}$; pH of 5; T=23° C.±1°. Samples were analyzed in triplicate (% RSD<15%). Because of high affinity of HMS for Pb ions the GFAA instrument operated at or near instrument detection limit. The Freundlich isotherm revealed a linear data plot. The results for removal efficiencies are shown in FIG. 2.

The results for the inventive technology can be compared to related art adsorbents. Prasad et al. have reported for initial concentrations of Pb$^{2+}$ at 10 and 50 mg L$^{-1}$, removal capacities of 0.039 to 0.579 μmol g$^{-1}$ of francolite mineral at 99.92 and 99.76% removal efficiencies. Krishnan et al. reports for an initial Pb$^{2+}$ concentration of 50 mg L$^{-1}$, a removal capacity of 120.0 μmol g$^{-1}$ of sulfurized steam activated carbon and a 99.7% removal efficiency. Lagadic et al., reports for an initial Pb$^{2+}$ concentration of 11 mg L$^{-1}$, removal capacities were less than 24.13 μmol per g thiol-functionalized magnesium phyllosilicate clay. Mercier and Pinnavala (Michigan State University) have reported Pb$^{2+}$ uptake by sulfhydryl functionalized MCM-41 and HMS, with capacities to 1.5 mmol/g. We found adsorption of at least these values and often greater.

Kinetics: The adsorption rate is critical to the correct design of an adsorption system. Kinetics experiment showed 1$^{st}$ order rates with rate constants of 0.011, 0.054, and 0.007 sec$^{-1}$ (r$^2$=0.97, 0.98, and 0.93), for HMS, MCM-41 and MCM-48, respectively. Reaction half life reaction order was MCM-41 (19 min)<HMS (66 min)<MCM-48 (108 min). Uptake for all adsorbents was very fast in the first hour of exposure.

Temperature: As temperature increases, adsorbent performance significantly improves (P=0.04, α=0.05, n=27). MCM-48 responded more dramatically to increased temperature while HMS and MCM-41 showed a linear increase with increasing temperature, suggesting an endothermic reaction.

The spontaneity order of the adsorbents for all temperatures measured is MCM-41>>HMS>MCM-48. The high positive enthalpy (ΔH) indicates each adsorbent reaction is strongly endothermic. The entropy (ΔS) values suggests an ordered structured series of MCM41>HMS>MCM-48. These endothermic adsorptions, indicated by the positive ΔH, suggest adsorption spontaneity is temperature correlated.

The lead removal efficiency improvement with increasing temperature demonstrates that each nanocomposite can operate successfully as lead adsorbents from about 23° C. to 45° C. Additional effectiveness can be expected as soil conditions may exceed 45° C. As a result, the lead removal effectiveness range is from about 0° C. to about 100° C., which is the temperature range of liquid water.

MCM-48 requires more time to reach equilibrium suggesting it has a longer ion diffusion path, and so the metal ions must penetrate more deeply to reach the adsorption sites than HMS and MCM-41. MCM-48 has a cubic bicontinuous structure while HMS and MCM-41 have hexagonal arrays of unidirectional pores. The higher rate of increase for each step probably relates to the pore size heterogeneity and pore size distribution.

The orderly structure of MCM-41 as compared to MCM-48 suggests an explanation for its faster rate of reaction. MCM-41 performs slightly better than HMS due most probably to an improved homogeneity as compared to HMS, thus yielding a faster rate of reaction. All three composites are usable as adsorbents where reaction speed plays an important factor in soils or very heterogeneous fast moving stormwaters.

The influence on adsorption by pH was studied over the pH range 2.0 to 12.0. There is a significant difference in adsorption due to the influence of pH (P=0.02, α=0.05, n=54). HMS and MCM-48 effective pH range is about 6 to 12. The MCM-41 adsorbent showed greater affinity to the Pb$^{2+}$ cation than HMS and MCM-48. MCM-41 effective pH range was 4 to 12. All adsorbents showed significant release of ions at pH≦3.5.

MCM-48 had degraded adsorption at pH=10, and this was significant as compared to pH values 6, 8, and 12 (P=0.04, α=0.05, n=12).

Hydrogen ions compete strongly for the exchangeable sites on the sorbent surface at lower pH or very high [H$^+$]. Use of adsorbents in SAFR soil and stormwater applications would be best at pH ranges of 7 to 10 for HMS, at pH=5 to 10 for MCM-41 and at pH=6 to 8 for MCM-48.

To investigate the possibility of competition between Pb$^{2+}$ and K$^+$, 0.01 M and 0.1 M KNO$_3$ were added. The amount of Pb$^{2+}$ adsorbed in the presence of these ions was then determined. There was a significant difference in adsorption performance in the presence of competing ions (P<<0.001, α=0.05, n=27). However, this difference was due primarily to the effects of significant degradation of HMS adsorption in the presence of competing ions, and a smaller contribution in difference by MCM-48. HMS decreased from 93% to approximately 49% lead removal at 0.01M KNO$_3$, and had a 70% removal at 0.1 M KNO$_3$. Repeat analyses were completed with similar results.

MCM-41 and MCM-48 showed improvements in adsorption with increasing ion presence. This slight improvement in MCM-41 performance was not significant (P=0.19, α=0.05, n=9), but the improvement by MCM-48 was statistically significant (P=0.004, α=0.05, n=9). These results indicates that HMS Pb$^{2+}$ attraction is electrostatic and hence strongly influenced by competing ions. MCM-41 and MCM-48 performance was enhanced in the presence of competing ions.

It has been known that for ions with the same valence, e.g., Hg, Cd, and Co, the sorbent prefers the metal with the higher atomic number. Lead's atomic number (82) is greater than potassium's (19), hence lead tends to have a greater affinity to the MCM-41 and MCM-48 sorbents. In competitive environments, this strong affinity to Pb ions will tend to increase their adsorption, as observed in MCM-41 and MCM-48. However, MCM-41 and MCM-48 demonstrate improved performance in the presence of K$^+$ ions suggesting strong coordinated bond sites. Comparatively, zeolites also have a strong affinity for Pb$^{2+}$ adsorption also, however their performance is strongly impacted by the presence or sorption of water, which would not make them viable for in-situ SAFR applications. Organosilicate nanocomposites are accordingly appropriate compounds for lead contaminated soils or stormwater environments.

Although Pb was used to test the effectiveness of mesoporous nanostructures for metal remediation, other metals can also be expected to be removed by these materials. These other metals can include, but are not restricted to, Hg, Cd, Zn, Sn, As, Sb, In, Se, Ga, Te, Bi, Ni, Cu, Mo, Ni, Cu, Sr, Ba and Co.

Desorption results show that the adsorbents held lead cations until pH values of 3.5 or less. The results show the spent adsorbents can be effectively regenerated for further use using appropriate pH reducing agents. At low pH, Pb$^{2+}$ can be labile from competition with other cations and is less susceptible to desorption with higher pH on amorphous silica. While probably a mixture of structure crystalline and amorphous phases, these nanocomposites do have a parallel pH response behavior. Based on this and the pH results, the best operating range for HMS is a pH of 6 to 10, for MCM-41 a pH 4 to 10, and for MCM-48 a pH of 6 to 8.

Qualitative Analysis. FTIR results, before and after exposure to lead, show several frequency shifts. These shifts most likely represent the presence of lead ion adsorbate in the nanocomposite.

The FTIR spectral peaks indicated the different sites available for interactions with lead ions. There are two major sites available for interaction with lead ions. First, the N moiety present in the surfactant head-group, and the second is the O moiety in the silicates framework.

The FTIR peaks show minor shifts in wave numbers from conditions of no exposure to exposure to lead due to the interaction between lead ions and other functional groups. Although small, these shifts are important indicators of molecular interactions and reflect the effect of the heavier lead ions on vibration frequencies, and the fact stronger bonds usually vibrate faster than weaker bonds. For example, when exposed to lead ions, HMS shifts for four significant peaks were 15, 10, 16, and 15 cm$^{-1}$, respectively. These shifts are significantly more than MCM-41 and MCM-48. The adsorbed lead ions are interacting more strongly within HMS than MCM-41 and MCM-48. This could imply lead ions in HMS are more closely associated with the external nanocomposite structure than MCM-41 and MCM-48 and may explain the reduced performance when exposed to competing ions.

In contrast, for the shifts due to the Si—O—Si bonds there were minimal shifts of only 1, 2 and 5 cm$^{-1}$. This may suggest a strong lead ion interaction with the N atom, and a substantially less, but noticeable interaction with the O moiety. Similarly, the higher peak shifts for MCM-41 and MCM-48 indicate a preference of the larger lead ion for the N moiety, which is slightly stronger than the interactions with the O moiety. The observed IR shifts reflect the presence of lead ions in the molecular sieve structure and thus may hint at the actual location of the atom according to reduced mass molecular vibrations.

The mesoporous nanocomposites such as HMS, MCM-41 and MCM-48 can be used in conjunction with other adsorbents. These auxiliary adsorbents can include, but are not restricted to, zeolites, clinoptilolites, chabazite, vermiculite, silica, 13X, molecular sieves, francolite, any organic source of phosphorous, corncob-based products, activated alumina, activated carbon and ion exchange resins.

The mesoporous nanocomposites such HMS, MCM-41 and MCM-48 can be combined with a suitable carrier. The carrier can include, but is not restricted to, at least one of sand, clay, kaolin, bentonite, diatomaceous earth, sawdust, plastic beads, water, and nonaqueous solvents. The carriers can also be at least one of the auxiliary adsorbents discussed above.

Although the product and method has been described for the removal of lead, the invention can be readily used for the remediation of other metals.

Although the invention has been explained by the embodiments shown in the drawings and described above, it should be understood that a person having ordinary skill in the art would not be limited to the described embodiments, but rather that various changes or modifications thereof are possible without departing from the spirit of the invention. Accordingly, the scope of the invention shall be determined only by the appended claims and their equivalents.

What is claimed is:

1. A method for remediating metals, which comprises:
   treating the metals at a pH of about 4 to 12 with a mesoporous nanocomposite that contains one or more head groups;
   wherein the mesoporous nanocomposite is produced by reacting $C_nH_{2n+1}X(R)_y$ and $Si(OC_2H_5)_4$, wherein $X(R)_y$ is $NH_2$, $NH_4^+$, $NR_4^+$, $OH^-$, $PO_4^{3-}$, $SO_4^{2-}$, or $SO_3^{2-}$, wherein R=H, $CH_3$, $C_2H_5$, $C_3H_7$ or $C_4H_9$; and n is 6-18; wherein $X(R)_y$ is not $NH_2$ when n is 12 and wherein $X(R)_y$ is not $N(CH_3)_4^+$ when m is 16.

2. The method of claim 1, wherein the metal is at least one metal selected from the group consisting of Pb, Hg, Cd, Zn, Sn, As, Sb, In, Se, Ga, Te, Bi, Ni, Cu, Mo, Ni, Cu, Sr, Ba and Co.

3. The method of claim 1, wherein the metal is Pb.

4. The method of claim 1, which further comprises:
desorbing the metal from the mesoporous nanostructure at a pH of about 2 or less.

5. The method of claim 1, wherein the metal is present in soil or an aqueous medium.

6. The method of claim 1, wherein the metal is present in a firing range soil or in stormwater.

7. The method of claim 1, wherein the treating is performed for at least about 19 minutes to 48 hours.

8. The method of claim 1, wherein the treating is performed at a temperature range of about 1-100° C.

9. The method of claim 1, wherein the treating is performed at a temperature range of about 23-45° C.

10. The method of claim 1, wherein the treating with the mesoporous nanocomposite is accompanied by treating with an auxiliary adsorbent.

11. The method of claim 9, wherein the auxiliary absorbent is at least one material selected from the group consisting of zeolites, clinoptilolites, chabazite, vermiculite, silica, 13X, molecular sieves, francolite, any organic source of phosphorus, corncob-based products, activated alumina, activated carbon and ion exchange resins.

12. The method of claim 1, wherein the mesoporous nanocomposite is selected from the group consisting of HMS, MCM-41, and MCM-48.

13. A method for remediating metals, which comprises:
treating the metals at a pH of about 4 to 12 with a mesoporous nanocomposite that contains one or more head groups;

wherein the mesoporous nanocomposite is produced by reacting $C_nH_{2n+1}X(R)_y$ and $Si(OC_2H_5)_4$, wherein $X(R)_y$ is $NH_2$, SH, $NH_4^+$, $NR_4^+$, $OH^-$, $PO_4^{3-}$, $SO_4^{2-}$, or $SO_3^{2-}$, wherein R=H, $CH_3$, $C_2H_5$, $C_3H_7$ or $C_4H_9$; and n is 6-18; wherein $X(R)_y$ is not $NH_2$ when n is 12 and wherein $X(R)_y$ is not $N(CH_3)_4^+$ when n is 16;
wherein the metal is present in a firing range soil or in stormwater.

14. The method of claim 13, wherein the metal is at least one metal selected from the group consisting of Pb, Hg, Cd, Zn, Sn, As, Sb, In, Se, Ga, Te, Bi, Ni, Cu, Mo, Ni, Cu, Sr, Ba and Co.

15. The method of claim 13, wherein the metal is Pb.

16. The method of claim 13, which further comprises:
desorbing the metal from the mesoporous nanostructure at a pH of about 2 or less.

17. The method of claim 13, wherein the treating is performed for at least about 19 minutes to 48 hours.

18. The method of claim 13, wherein the treating is performed at a temperature range of about 1-100° C.

19. The method of claim 13, wherein the treating is performed at a temperature range of about 23-45° C.

20. The method of claim 13, wherein the treating with the mesoporous nanocomposite is accompanied by treating with an auxiliary adsorbent.

21. The method of claim 19, wherein the auxiliary absorbent is at least one material selected from the group consisting of zeolites, clinoptilolites, chabazite, vermiculite, silica, 13X, molecular sieves, francolite, any organic source of phosphorus, corncob-based products, activated alumina, activated carbon and ion exchange resins.

22. The method of claim 13, wherein the mesoporous nanocomposite is selected from the group consisting of HMS, MCM-41, and MCM-48.

* * * * *